(12) United States Patent
Mei

(10) Patent No.: US 12,046,984 B2
(45) Date of Patent: Jul. 23, 2024

(54) AUTOMATIC FREQUENCY OSCILLATOR FOR PULSE-REGULATED SWITCH-MODE POWER SUPPLY

(71) Applicant: TEXAS INSTRUMENTS INCORPORATED, Dallas, TX (US)

(72) Inventor: Tawen Mei, Sunnyvale, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 115 days.

(21) Appl. No.: 17/586,555

(22) Filed: Jan. 27, 2022

(65) Prior Publication Data

US 2022/0149729 A1 May 12, 2022

Related U.S. Application Data

(62) Division of application No. 16/731,404, filed on Dec. 31, 2019, now Pat. No. 11,271,479.

(60) Provisional application No. 62/835,756, filed on Apr. 18, 2019.

(51) Int. Cl.
*H02M 3/156* (2006.01)
*H02M 1/00* (2006.01)

(52) U.S. Cl.
CPC ....... *H02M 1/0003* (2021.05); *H02M 1/0048* (2021.05); *H02M 3/156* (2013.01); *H02M 3/1566* (2021.05); *H02M 1/0032* (2021.05)

(58) Field of Classification Search
CPC ............. H02M 1/0003; H02M 1/0032; H02M 3/1566; H02M 3/156; H02M 3/158
See application file for complete search history.

(56) References Cited

U.S. PATENT DOCUMENTS

| | | | |
|---|---|---|---|
| 9,287,776 B2 | 3/2016 | Mei | |
| 2015/0061628 A1* | 3/2015 | Nguyen | H03K 5/135 |
| | | | 323/282 |
| 2017/0070149 A1* | 3/2017 | Guan | H02M 1/36 |
| 2019/0326891 A1* | 10/2019 | Zhu | H03K 5/003 |

* cited by examiner

*Primary Examiner* — Alex Torres-Rivera
(74) *Attorney, Agent, or Firm* — Ray A. King; Frank D. Cimino

(57) ABSTRACT

In some examples, a switch-mode power supply circuit comprises a pulse generation circuit comprising an oscillator, the oscillator configured to generate first pulses using a fixed frequency regulation for a first load condition that exceeds a predefined threshold and configured to generate second pulses using a variable frequency regulation for a second load condition that does not exceed the predefined threshold. The circuit also includes a power converter coupled to the pulse generation circuit and configured to convert a first voltage to a regulated voltage using either one of the first or second pulses generated by the pulse generation circuit. The circuit further comprises an output filter coupled to the power converter and configured to produce a second voltage from the regulated voltage.

4 Claims, 9 Drawing Sheets

AUTOMATIC FREQUENCY OSCILLATOR FOR PULSE-REGULATED SWITCH-MODE POWER SUPPLY

CROSS-REFERENCE TO RELATED APPLICATIONS

The division application claims priority to U.S. patent application Ser. No. 16/731,404, filed Dec. 31, 2019, which application claims the benefit of and priority to U.S. Provisional Application No. 62/835,756, filed Apr. 18, 2019, all which are incorporated herein by reference in their entirety.

BACKGROUND

Various electronic devices (e.g., handheld communication devices, medical devices, consumer electronics, sensors, etc.) are powered by direct current (DC) power supplies. To provide reliable operations for the electronic devices, the voltage supplied by a DC power supply is often filtered and regulated. A converter/regulator circuit of the DC power supply filters and regulates a voltage supplied by a DC source. A converter circuit converts the voltage supplied by the DC source from an input voltage to a filtered output voltage. A regulator circuit ensures that the output voltage provided is steady. The converter circuit often comprises the regulator circuit, so a converter may be referred to as a converter, regulator, or converter/regulator.

A regulator may be linear or switching. A linear regulator adjusts a voltage divider network to maintain a steady output voltage. The linear regulator utilizes simple circuit components (e.g., resistors, diodes), has a low output ripple, and provides a fast response time to load changes with low electromagnetic interference (EMI). However, the linear regulator wastes energy by dissipating the difference between the input voltage and the output voltage as heat.

A switching regulator maintains a steady output voltage by turning a switch on and off. When the switch is on, a voltage drop across the switch is low, so most of the voltage is transferred to the load. When the switch is off, there is less current flow through the switching regulator than a current flow through a linear regulator. The efficient transfer of voltage under load conditions and the low current consumption during light load conditions results in less wasted energy. Therefore, the switching regulator tends to operate more efficiently than the linear regulator.

Field-effect transistor (FETs) are often utilized as the switches that turn on and off to maintain the output voltages of the switching regulators. A FET may be driven by a signal generated either by a pulse-width modulation (PWM) circuit or by a pulse-frequency modulation (PFM) circuit. A PWM circuit utilizes a fixed-frequency oscillator to generate a drive signal having a varying duty cycle. The duty cycle is the ratio between the switch on time and the switch off time. Adjusting the pulse width of the drive signal adjusts the duty cycle. A PFM circuit utilizes a variable-frequency oscillator to generate a drive signal having a varying frequency cycle.

SUMMARY

In some examples, a switch-mode power supply circuit comprises a pulse generation circuit comprising an oscillator, the oscillator configured to generate first pulses using a fixed frequency regulation for a first load condition that exceeds a predefined threshold and configured to generate second pulses using a variable frequency regulation for a second load condition that does not exceed the predefined threshold. The circuit also includes a power converter coupled to the pulse generation circuit and configured to convert a first voltage to a regulated voltage using either one of the first or second pulses generated by the pulse generation circuit. The circuit further comprises an output filter coupled to the power converter and configured to produce a second voltage from the regulated voltage.

In some examples, a device comprises a current mirror having an input node and an output node; a first transistor having at least one terminal coupled to the input node of the current mirror; a capacitor having a first end coupled to the output node and a second end coupled to ground; a second transistor having a first control terminal coupled to a clock circuit, a second control terminal coupled to ground, and a non-control terminal coupled to the output node; and a buffer having a fixed threshold voltage, wherein an input of the buffer is coupled to the output node.

In some examples, a switch-mode power supply circuit comprises an output filter configured to provide an output voltage and a pulse generation circuit. The pulse generation circuit comprises a comparator configured to compare a voltage based on the output voltage of the output filter to a reference voltage, and an oscillator configured to provide, based on an output voltage of the comparator, an output clock signal having either a fixed frequency based on an input clock signal or a variable frequency. The switch-mode power supply circuit also comprises a power converter configured to be operated using the output clock signal.

In some examples, a switch-mode power supply circuit comprises an error amplifier configured to generate a first output signal based on a reference voltage and a feedback voltage; an oscillator configured to generate a pulsed signal based on the first output signal; a power converter configured to receive the pulsed signal and to generate a second output signal based on an input voltage to the power converter regulated by the pulsed signal; an output filter configured to receive the second output signal and to generate an output voltage; and a resistive divider circuit configured to receive the output voltage and generate the feedback voltage based on the output voltage.

BRIEF DESCRIPTION OF THE DRAWINGS

For a detailed description of various examples, reference will now be made to the accompanying drawings in which.

DETAILED DESCRIPTION

As explained above, a direct current (DC) power supply includes circuitry to convert an input voltage supplied by a DC source to a steady output voltage. Because a linear regulator dissipates the difference between the input voltage and the output voltage as heat, a switching regulator, due to increased energy conversion efficiency, may be used as a regulator in the DC power supply. A pulse-width modulation (PWM) regulator offers a predictable operating frequency, low output ripple characteristics, and high efficiency during heavy load conditions. However, under variable load conditions, instability in a feedback voltage may occur near switching boundaries between the loads. Instability results in reduced energy conversion efficiency of the DC power supply. A pulse-frequency modulation (PFM) regulator is more efficient in low power operations. Some currently used DC power supplies utilize a PWM regulator under heavy loads and a PFM regulator under light load to moderate load conditions to provide smoother switching. However, instability in the average output voltage and high quiescent current may still result.

Accordingly, described herein are various examples of pulse-regulated switch-mode power supplies that comprise automatic frequency oscillator circuits to overcome the challenges mentioned above. Implementing an automatic frequency oscillator circuit described in this disclosure enables the driving of an output voltage according to a lower frequency of a fixed frequency clock signal and a variable frequency signal based on a load of the power supply. Under heavy load conditions, the automatic frequency oscillator generates fixed frequency pulses. For light load to moderate load conditions, the automatic frequency oscillator generates variable frequency pulses. Because the automatic frequency oscillators do not stop generating frequency pulses, the pulse-regulated switch-mode power supplies are able to efficiently respond to load demands and maintain stable average output voltages. The automatic frequency oscillator circuits also result in low quiescent currents. Illustrative pulse-regulated switch-mode power supplies containing automatic frequency oscillator circuits are now described in detail with respect to the drawings.

Figure 1:
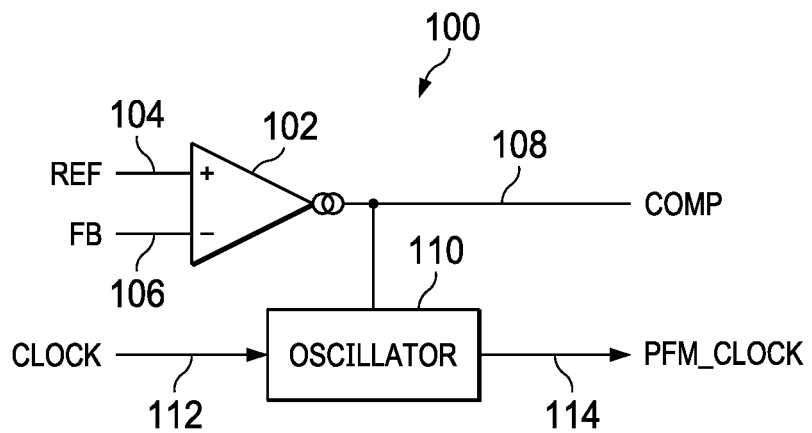
FIG. 1 depicts a schematic diagram of an automatic frequency oscillator in accordance with various examples.

FIG. 1 depicts a schematic diagram of an automatic frequency oscillator 100, in accordance with various examples. The following paragraphs describe examples of different automatic frequency oscillator 100 circuits that are included in a pulse-regulated switch-mode power supply. Pulse-regulated switch-mode power supplies include buck converters, boost converters, and buck-boost converters, for example. The specific technical advantages produced by pulse-regulated switch-mode power supplies including these automatic frequency oscillator 100 circuits—e.g., stable average output voltages and low quiescent currents—are also described.

In some examples, the automatic frequency oscillator 100 includes an oscillator 110 and a comparator 102 (also referred to herein as an error amplifier). The oscillator 110 includes variable one-shot circuits and voltage-controlled oscillators, for example. Illustrative details regarding the contents of a variable one-shot circuit performing as the oscillator 110 are provided below with respect to FIG. 4. Illustrative details regarding the contents of a voltage-controlled oscillator as the oscillator 110 are provided below with respect to FIG. 6. The comparator 102 includes any suitable type of comparator, such as an amplifier, a transconductance amplifier, or a transconductor, for example. An output of the comparator 102 is coupled to an input of the oscillator 110.

The automatic frequency oscillator 100 includes multiple input paths, including a reference path 104 (which carries a voltage REF), a feedback path 106 (which carries a voltage FB), and a clock path 112 (which carries a signal CLOCK). The voltage REF is a voltage from an external DC source. In some examples the voltage REF is referred to as a reference voltage. The voltage FB is a voltage based on an output voltage of the pulse-regulated switch-mode power supply, as described below with respect to FIG. 3. In some examples, a voltage FB is referred to as a feedback voltage. The reference voltage is based on a predetermined demand threshold. The feedback voltage represents the actual demand. The reference path 104 is coupled to a non-inverting input of the comparator 102. The feedback path 106 is coupled to an inverting input of the comparator 102. The clock path 112 is coupled to a first input of the oscillator 110. In some examples, the signal CLOCK is referred to as a fixed-frequency clock signal. An illustrative circuit for providing the signal CLOCK is provided below with respect to FIG. 6.

The automatic frequency oscillator 100 includes multiple output paths, including a path 108 (which carries a signal COMP) and a clock path 114 (which carries a signal PFM_CLOCK). The path 108 is coupled to an output of the comparator 102 and to a second input of the oscillator 110. In some examples, a voltage of the signal COMP is referred to as an output voltage of the comparator 102. The clock path 114 is coupled to an output of the oscillator 110. In some examples, the signal PFM_CLOCK is referred to as an output clock signal.

In further examples, the comparator 102 is configured to act as an error amplifier. The comparator 102 compares the voltage REF received at the non-inverting input coupled to the reference path 104 and the voltage FB received at the inverting input coupled to the feedback path 106. Based on the comparison of the voltage REF and the voltage FB, the comparator 102 generates the signal COMP as an output signal on the path 108. When the signal COMP is below the predetermined demand threshold, a light to moderate load condition exists. When the signal COMP is above the predetermined demand threshold, a heavy load condition exists. The oscillator 110 is configured to receive the signal COMP as a second input. As described below with respect to FIG. 4, the oscillator 110 generates a frequency pulse (e.g., the signal PFM_CLOCK) based on a comparison of a signal based on a voltage of the signal COMP (e.g., a signal PFM_COMP) and the signal CLOCK.

Figure 2:
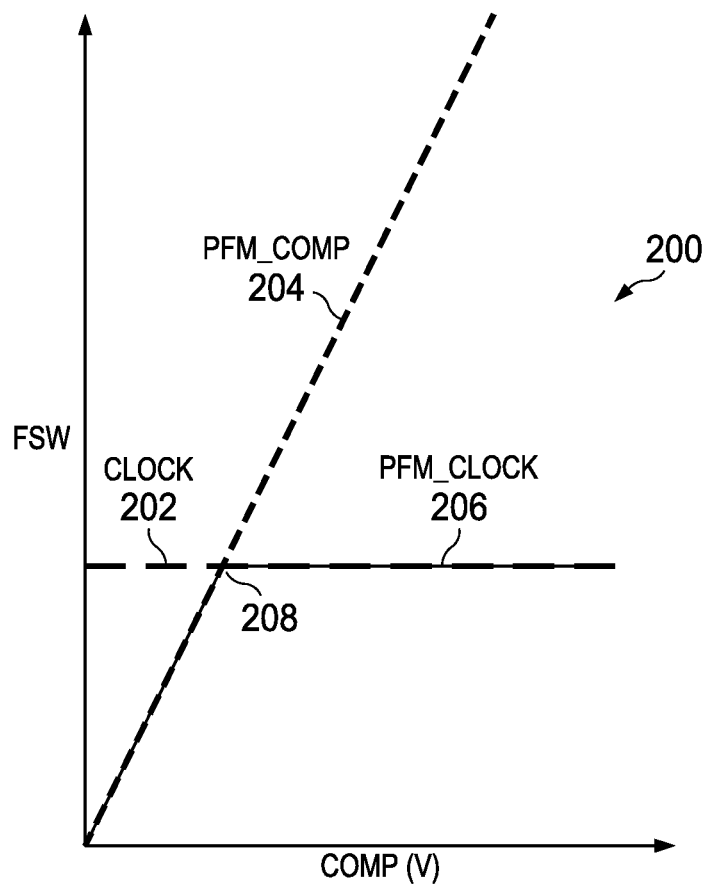
FIG. 2 depicts a timing diagram of an automatic frequency oscillator in operation in accordance with various examples.

FIG. 2 depicts a timing diagram 200 of the operation of the automatic frequency oscillator 100, in accordance with various examples. The x-axis indicates a voltage of the COMP signal. The y-axis indicates a frequency of a waveform. A CLOCK waveform 202 corresponds to a fixed frequency of the signal CLOCK on the clock path 112 (FIG. 1). A PFM_COMP waveform 204 corresponds to a variable frequency of the signal PFM_COMP. (As similarly noted in describing FIG. 1, refer to the discussion below with respect to FIG. 4 for a description of the effect of the voltage of the signal COMP on the signal PFM_COMP.) A PFM_CLOCK waveform 206 corresponds to a frequency of the signal PFM_CLOCK on the clock path 114 (FIG. 1). Because the signal PFM_CLOCK is determined by the comparison of the signal CLOCK and the signal PFM_COMP, the two waveforms are presented on the same axis. A point 208 corresponds to the predefined demand threshold at which the frequency of the signal PFM_CLOCK switches from the frequency of the signal PFM_COMP as a basis to the frequency of the signal CLOCK as a basis.

Referring to the waveforms of FIG. 2 along with FIG. 1, initially, the voltage of the signal COMP is low, indicating light load to moderate load. Under light load to moderate load, the comparison of the reference voltage (e.g., voltage REF) and the feedback voltage (e.g., voltage FB) by the comparator 102 generates the low voltage of the signal COMP. The low voltage of the signal COMP is input into the oscillator 110, which generates the signal PFM_COMP having a frequency based on the voltage of the signal COMP. Because the voltage of the signal COMP is low, the signal PFM_COMP has a low frequency. The low frequency of the signal PFM_COMP is below the fixed frequency of the signal CLOCK. Based on the comparison of the frequency of the signal PFM_COMP and the frequency of the signal CLOCK, the oscillator 110 propagates the signal PFM_COMP as the signal PFM_CLOCK. (As similarly noted above, refer to the discussion below with respect to FIG. 4 for a description of the effect of the voltage of the signal COMP on the signal PFM_COMP of the oscillator 110.)

Still referring to the waveforms of FIG. 2 along with FIG. 1, under heavy loads, the comparison of the reference voltage and the feedback voltage by the comparator 102 generates a voltage of the signal COMP that exceeds the predefined demand threshold. Because the voltage of the signal COMP is increasingly higher, the signal PFM_COMP has an increasingly higher frequency. When the frequency of the signal PFM_COMP exceeds the fixed frequency of the signal CLOCK, the oscillator 110 propagates the signal CLOCK as the signal PFM_CLOCK. (As similarly noted above, refer to the discussion below with respect to FIG. 4 for a description of the effect of the voltage of the signal COMP on the signal PFM_COMP of the oscillator 110.) In this manner, the lower of the two frequencies of the CLOCK waveform 202 and the PFM_COMP waveform 204 is used as a switching frequency of the signal PFM_CLOCK of the automatic frequency oscillator 100. The automatic nature of the frequency oscillator 100 enables, at steady state, an average output voltage which is independent of load.

Figure 3:
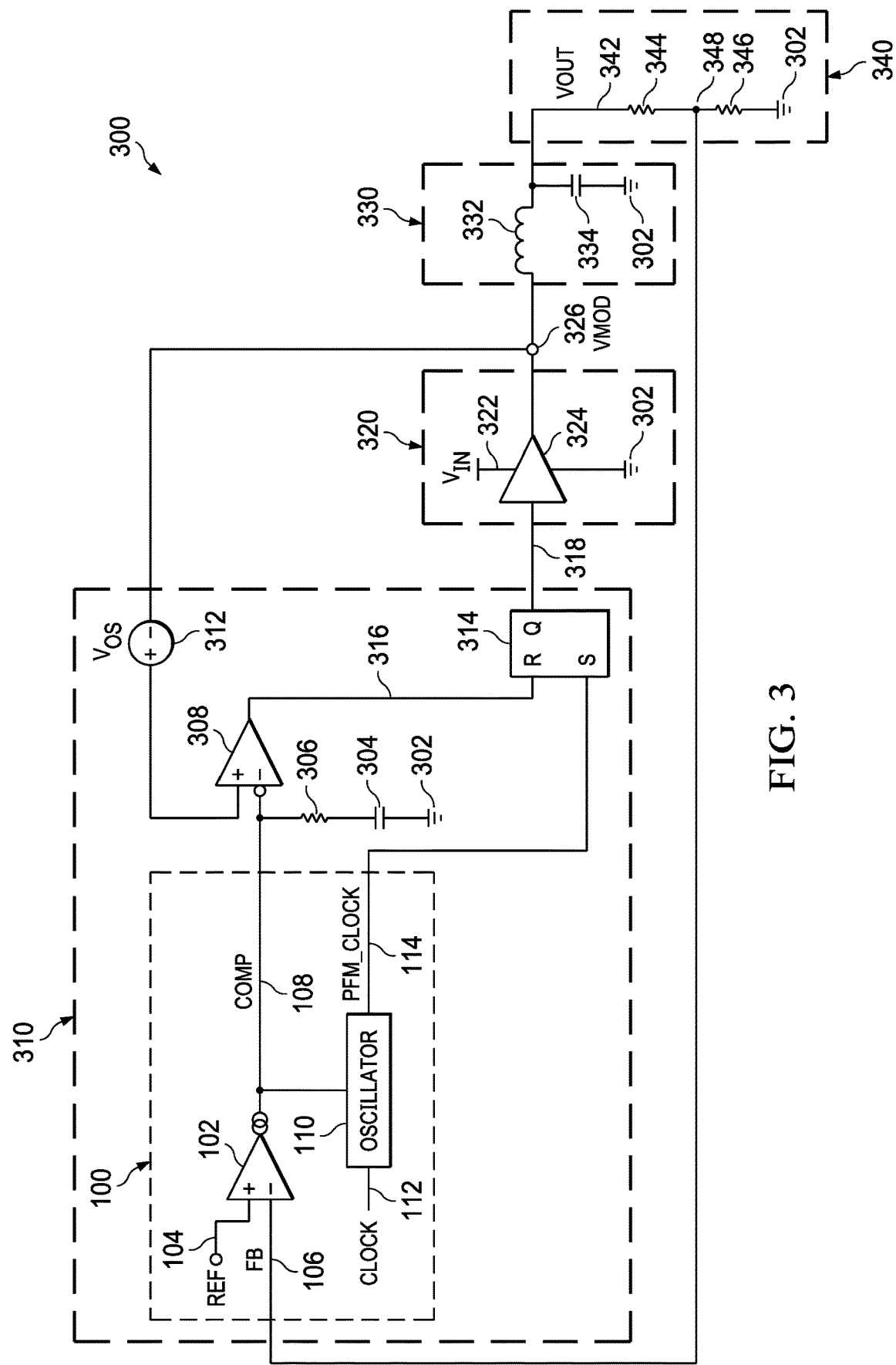
FIG. 3 depicts a schematic diagram of a pulse-regulated switch-mode power supply circuit containing an automatic frequency oscillator in accordance with various examples.

FIG. 3 depicts a schematic diagram of a pulse-regulated switch-mode power supply circuit 300 comprising an automatic frequency oscillator 100, in accordance with various examples. In some examples, the pulse-regulated switch-mode power supply circuit 300 includes a pulse generator section 310, a power converter section 320, an output filter 330, and a load section 340. The pulse generator section 310 includes the automatic frequency oscillator 100 (as discussed above with respect to FIG. 1), a comparator 308, an RC network comprising a resistor 306 and a capacitor 304, a voltage source 312, and an RS flip-flop 314. The power converter section 320 includes a power converter 324. The power converter 324, in some examples, includes any suitable type of power driver, such as a comparator or amplifier, and in some examples further includes switching circuitry to pull its output high or low, depending on its input. The output filter 330 includes an inductor 332 and a capacitor 334. The load section 340 includes a voltage divider comprising a resistor 344 and a resistor 346.

As discussed above with respect to FIG. 1, the reference path 104 is coupled to a noninverting input of the comparator 102, and the feedback path 106 is coupled to an inverting input of the comparator 102. The feedback path 106 is also coupled to a node 348 of the load section 340. As discussed above with respect to FIG. 1, the path 108 is coupled to an output of the comparator 102 and to the second input of the oscillator 110. The path 108 is also coupled to an inverting input of the comparator 308 through an inverter and a first end of the resistor 306. The second end of the resistor 306 is coupled to a first end of the capacitor 304. The second end of the capacitor 304 is coupled to ground 302. The non-inverting input of the comparator 308 is coupled to the voltage source 312. The voltage source 312 is coupled to the non-inverting input of the comparator 308 has a current-sensing connection (as indicated by the hollow circle symbol) to the node 326. The node 326 couples the power converter section 320 and the output filter 330.

As discussed above with respect to FIG. 1, the clock path 114 is coupled to the output of the oscillator 110. The clock path 114 is also coupled to a set input (S) of the RS flip-flop 314. A path 316 is coupled to an output of the comparator 308 and a reset input (R) of the RS flip-flop 314. An output of the RS flip-flop 314 is coupled to a path 318 and an input of the power converter 324. An output of the power converter 324 is coupled to the node 326, the voltage source 312, and a first end of the inductor 332. A second end of the inductor 332 is coupled to a first end of the capacitor 334. A second end of the capacitor 334 is coupled to ground 302. The second end of the inductor 332 and the first end of the capacitor 334 are coupled to a first end of the resistor 344. A second end of the resistor 344 is coupled to the node 348 and a first end of the resistor 346. A second end of the resistor 346 is coupled to ground 302.

The pulse-regulated switch-mode power supply circuit 300 includes multiple signals. In addition to the signals discussed above with respect to the automatic frequency oscillator 100 (FIG. 1), the pulse generator section 310 includes an output of the comparator 308 (carried on the path 316) and an output signal Q of the RS flip-flop 314 (carried on the path 318). The power converter section 320 receives a signal VIN on an input path 322 (e.g., a voltage rail of the pulse-regulated switch-mode power supply 300) and outputs a regulated voltage VMOD at the node 326. The output filter 330 outputs a voltage VOUT on a path 342. In some examples, the voltage VOUT is referred to as an output voltage. In further examples, the feedback voltage is based on the voltage VOUT. The feedback voltage is proportional to the voltage VOUT. The proportion is determined by a ratio of the voltage divider of the load section 340. The ratio of the voltage divider of the load section 340 is determined by the predefined demand threshold which establishes when the signal PFM_CLOCK switches from the frequency of the signal PFM_COMP to the frequency of the signal CLOCK. As similarly noted above with respect to FIG. 1, an illustrative circuit for providing the signal CLOCK is provided below with respect to FIG. 6.

The operation of the pulse-regulated switch-mode power supply circuit 300 as depicted in FIG. 3 is now described. In some examples, the switching of the power converter section 320 does not stop. As described above with respect to FIG. 2, the oscillator 110 generates the signal PFM_CLOCK based on the comparison of the signal CLOCK and the signal PFM_COMP, which is based on the voltage of the signal COMP. (As similarly noted in describing FIGS. 1 and 2, refer to the discussion below with respect to FIG. 4 for a description of the effect of the voltage of the signal COMP on the signal PFM_COMP.) The RC network (e.g., resistor 306, capacitor 304) is a frequency compensation network. The signal PFM_CLOCK is the set input of the RS flip-flop 314. The RS flip-flop 314 is configured to prevent multiple pulses during a pulse cycle. The output signal Q is high when the set input is high and the reset input is low, and the output signal Q is low when the set input is low and the reset input is high. The reset input goes high when the voltage equivalent of the current sensed at node 326, adjusted by the voltage produced by the voltage source 312, is greater than the corresponding voltage represented by the voltage COMP. In further examples, the pulse-regulated switch-mode power supply circuit 300 is designed to prevent the voltage of the signal COMP from dropping below the voltage supplied by the voltage source 312. (See discussion below with respect to FIG. 7 for an illustrative circuit designed to prevent the voltage of the signal COMP from dropping below the voltage supplied by the voltage source 312.) When the signal PFM_CLOCK is high, the output signal Q is high; when the signal PFM_CLOCK is low, the output signal Q is low. When the output signal Q is high, the power converter 324 sets VMOD to equal a voltage of the signal VIN. When the output signal Q is low, the power converter 324 sets VMOD to equal ground 302. In this manner, the power converter 324 delivers the regulated voltage VMOD (e.g., the voltage of the signal VIN as regulated by the signal PFM_CLOCK) to the node 326. The inductor 332 develops a current from the regulated voltage VMOD. The current charges the capacitor 334, which delivers the voltage VOUT.

Assume now that a light load to moderate load is placed on the pulse-regulated switch-mode power supply circuit 300. In this scenario, the comparison between the feedback voltage and the reference voltage results in the signal COMP having a low voltage. As discussed above with respect to FIG. 2, when the voltage of the signal COMP is low, the oscillator 110 produces a low, variable frequency signal PFM_CLOCK equivalent to the signal PFM_COMP. When the signal PFM_CLOCK is high, the output signal Q goes high and the power converter 324 sets VMOD equal to the voltage of the signal VIN. When the signal PFM_CLOCK is low, the output signal Q goes low and the power converter 324 sets VMOD equal to ground 302. In this manner, the power converter 324 delivers the regulated voltage VMOD to the output filter 330, which delivers the voltage VOUT.

Assume now that a heavy load is placed on the pulse-regulated switch-mode power supply circuit 300. In this scenario, the comparison between the feedback voltage and the reference voltage results in the signal COMP carrying a high voltage (e.g., 0V to 1V). As discussed above with respect to FIG. 2, when the voltage of the signal COMP is high, the oscillator 110 produces a fixed frequency signal PFM_CLOCK equivalent to the signal CLOCK. When the signal PFM_CLOCK is high, the output signal Q goes high and the power converter 324 sets VMOD equal to the voltage of the signal VIN. When the signal PFM_CLOCK is low, the output signal Q goes low and the power converter 324 sets VMOD equal to ground 302. In this manner, the power converter 324 delivers the regulated voltage VMOD to the output filter 330, which delivers the voltage VOUT. As demonstrated, under all load conditions, the switching of the power converter section 320 does not stop. As a result, the advantages of an average output voltage that is steady and independent of load are realized.

Figure 4:
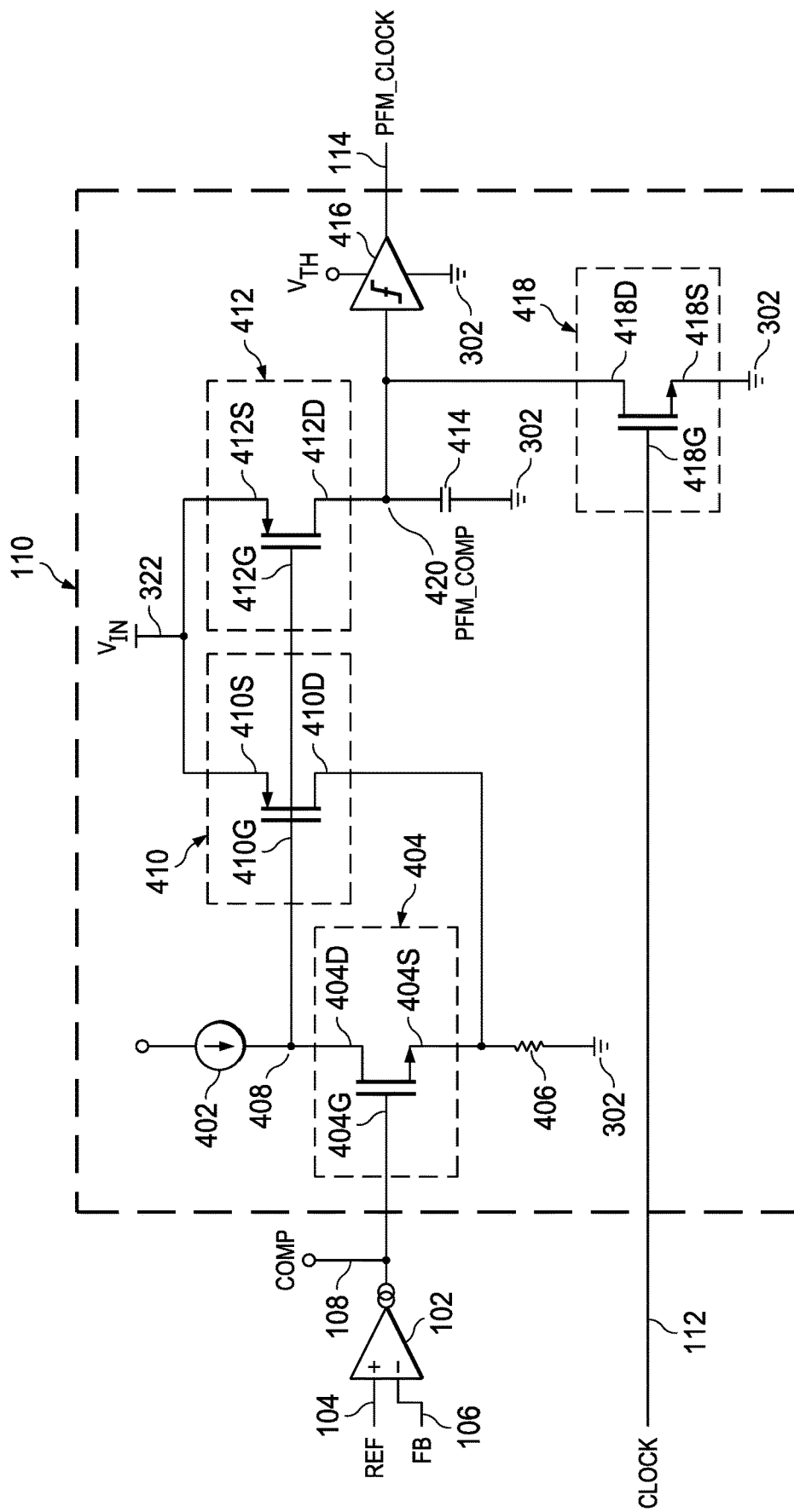
FIG. 4 depicts a schematic diagram of an automatic frequency oscillator circuit in accordance with various examples.

FIG. 4 is a schematic diagram of the oscillator 110, in accordance with various examples. The oscillator 110 couples to the feedback path 106, the path 108, and the clock path 114 of FIG. 3. In some examples, the oscillator 110 comprises a variable one-shot circuit and includes a current source 402, a transistor 404, a transistor 410, a transistor 412, a transistor 418, a resistor 406, a capacitor 414, and a buffer 416. In some examples, the transistors 404, 410, 412, 418 are field-effect transistors (FETs). In further examples, the transistors 404, 418 are n-channel metal-oxide semiconductor FETs (e.g., nMOSFETs, NMOS) and the transistors 410, 412 are p-channel MOSFETs (e.g., pMOSFETs, PMOS). In some examples, the buffer 416 is a digital buffer having a fixed threshold VTH. The fixed threshold VTH includes a margin of variation of plus or minus 10 percent from a baseline value of VTH. Thus, for example, a VTH that varies within 10 percent of a certain value is fixed. A similar margin of variation from baseline applies for other fixed parameters described herein. In other examples, the buffer 416 is a comparator having a fixed threshold VTH as an input. In some examples, the transistor 418 is replaced by another type of switch, such as a diode. Similar to the discussion above with respect to FIG. 1, the output of the comparator 102 is coupled to a second input of the oscillator 110.

The oscillator 110 includes multiple input paths. The clock path 112 carries the signal CLOCK (FIG. 1). The path 108 carries the signal COMP (FIG. 1). The input path 322 carries the signal VIN (FIG. 3). The oscillator 110 also includes an output path. The clock path 114 carries the signal PFM_CLOCK (FIG. 1).

The transistor 404 comprises a drain terminal 404D, a gate terminal 404G, and a source terminal 404S. The gate terminal 404G, referred to herein as a control terminal or a first control terminal, is coupled to the path 108 carrying the signal COMP. The source terminal 404S, referred to herein as a control terminal or a second control terminal, is coupled to a first end of the resistor 406. A second end of the resistor 406 is coupled to ground 302. The drain terminal 404D, referred to herein as a non-control terminal, is coupled to the current source 402 at an input node 408.

The transistor 410 comprises a drain terminal 410D, a gate terminal 410G, and a source terminal 410S. The drain terminal 410D is coupled to the source terminal 404S and the first end of the resistor 406. The gate terminal 410G is coupled to the input node 408, the current source 402, and the drain terminal 404D. The source terminal 410S is coupled to the input path 322 carrying the signal VIN.

The transistor 412 comprises a drain terminal 412D, a gate terminal 412G, and a source terminal 412S. The source terminal 412S is coupled to the input path 322 carrying the signal VIN and the source terminal 410S. The drain terminal 412D is coupled to an output node 420, a first end of the capacitor 414, and an input of the buffer 416. A second end of the capacitor 414 is coupled to ground 302.

The transistor 418 comprises a drain terminal 418D, a gate terminal 418G, and a source terminal 418S. The source terminal 418S is coupled to ground 302 via the resistor 406. The gate terminal 418G is coupled to the clock path 112 carrying the signal CLOCK. As similarly noted in describing FIGS. 1 and 3, an illustrative circuit for providing the signal CLOCK is provided below with respect to FIG. 6. The drain terminal 418D is coupled to the output node 420, the first end of the capacitor 414, the drain terminal 412D, and the input of the buffer 416. An output of the buffer 416 is coupled to the clock path 114 carrying the signal PFM_CLOCK.

In operation, the transistor 404 and the resistor 406 are configured as a common drain amplifier to amplify the voltage of the signal COMP, which drives the gate terminal 404G. The current source 402 generates a fixed current, and the voltage across the gate 404G and source 404S determines the current that flows through the transistor 404. When the transistor 404 is on, the current through the resistor 406 is the current through the transistor 404 plus a current through the transistor 410. In this manner, the current through the resistor 406 is a function of the voltage of the signal COMP. A current of the transistor 412 mirrors the current through the transistor 410, so the current of the transistor 412 equals the voltage at 404S divided by a resistance of the resistor 406, less the current flowing through the transistor 404, multiplied by a ratio of the mirrored current between the transistor 412 and the transistor 410. Thus, the current through the transistor 412 is a function of the voltage of the signal COMP. (The transistors 410, 412 are also referred to herein as a current mirror.) The current of the transistor 412 controls a ramp rate (also referred to herein as a charging rate) of the capacitor 414. The ramp rate of the capacitor 414 is equal to the current of the transistor 412 divided by a capacitance of the capacitor 414. The ramp rate of the capacitor 414 determines the frequency of the signal PFM_COMP. (In various examples, such as in FIG. 4, the frequency and pulse width of the PFM_COMP signal are related, and the frequency and pulse width of the PFM_CLOCK signal are also related. When the circuit 300 is in a steady state of operation, the frequencies of the aforementioned signals are being regulated, and the reciprocal of frequency is period, which relates to the pulse widths of the aforementioned signals.) In this manner, the signal PFM_COMP is based on the voltage of the signal COMP. When a voltage of the capacitor 414 at output node 420 exceeds the fixed threshold VTH of the buffer 416 and when the signal CLOCK on the clock path 112, which drives the gate terminal 418G, switches on the transistor 418, then the signal PFM_CLOCK on the clock path 114 goes high. In this manner, the timing of the signal PFM_CLOCK is regulated by the voltage of the signal COMP. Assume now that a light load to moderate load is coupled to the output VOUT of the pulse-regulated switch-mode power supply circuit 300. As discussed above with respect to FIG. 3, under light load to moderate load conditions, the comparison between the feedback voltage and the reference voltage results in the signal COMP carrying a low voltage (e.g., 0 V to 1 V). When the voltage of the signal COMP is low, the current mirror of the oscillator 110 generates low current (e.g., 0 micro-amps to 10 micro-amps), so the capacitor 414 is charged slowly, and the frequency of the signal PFM_COMP is low (e.g., typical frequency range 0 MHz to 3 MHz; low meaning 0 kHz to 500 kHz). The signal PFM_CLOCK will not go high until the voltage of the capacitor 414 at the output node 420 exceeds the threshold VTH of the buffer 416. In examples, when the charged voltage across the capacitor 414 is below the threshold VTH between two rising edges of the CLOCK signal, the PFM_CLOCK signal will be kept low for two CLOCK pulses, thereby reducing the frequency of the CLOCK signal. Thus, by suppressing or skipping one or more pulses between two or more CLOCK cycles, the oscillator 110 is configured to adjust or regulate the frequency of PFM_CLOCK based on a comparison between the feedback voltage and the reference voltage. Therefore, the frequency of the signal PFM_COMP is governing the system switching frequency. In this manner, when the voltage of the signal COMP is low, the signal PFM_CLOCK is a variable-frequency regulated clock, where the variable frequency is determined by the frequency of the signal PFM_COMP as determined by the charging rate of the capacitor 414. As illustrated by the low current of the current mirror, the oscillator 110 results in a low quiescent current (e.g., 0.1 micro-amps to 1 micro-amp) under light to moderate load conditions.

Assume now that a heavy load is placed on the pulse-regulated switch-mode power supply circuit 300. As discussed above with respect to FIG. 3, under heavy load conditions, the comparison between the feedback voltage and the reference voltage results in the signal COMP having a high voltage (e.g., 0.8 V to 1V). When the voltage of the signal COMP is high, the capacitor 414 is charged more rapidly, and the frequency of the signal PFM_COMP is high. However, the signal PFM_CLOCK cannot go high when the voltage of the capacitor 414 at the output node 420 exceeds the fixed threshold VTH of the buffer until the signal CLOCK is high. Hence the frequency of the signal CLOCK controls the signal PFM_CLOCK. In this manner, when the voltage of the signal COMP is high, the signal PFM_CLOCK is a fixed-frequency regulated clock, where the fixed frequency is determined by the frequency of the signal CLOCK. As illustrated by the examples, the switching of PFM_CLOCK does not stop, so the advantages of an average output voltage that is steady and independent of load are realized.

Figure 5:
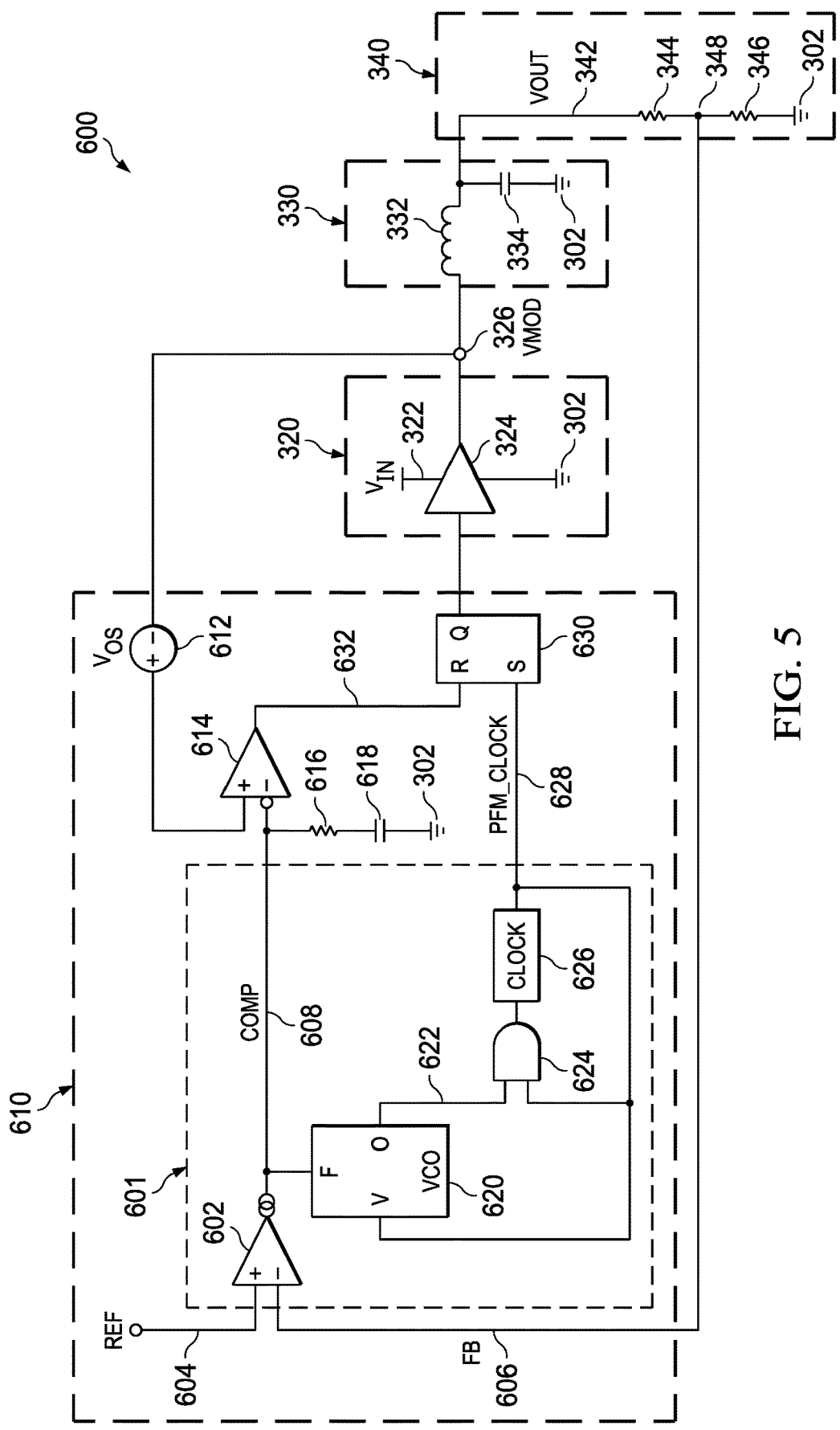
FIG. 5 depicts a schematic diagram of a pulse-regulated switch-mode power supply circuit containing an automatic frequency oscillator in accordance with various examples.

FIG. 5 depicts a schematic diagram of another illustrative pulse-regulated switch-mode power supply circuit 600 containing an automatic frequency oscillator 601, in accordance with various examples. In some examples, the pulse-regulated switch-mode power supply circuit 600 includes a pulse generator section 610, a power converter section 320 (FIG. 3), an output filter 330 (FIG. 3), and a load section 340 (FIG. 3). The pulse generator section 610 includes a comparator 614, an RC network comprising a resistor 616 and a capacitor 618, a voltage source 612, the automatic frequency oscillator 601, and an RS flip-flop 630. The automatic frequency oscillator 601 includes an error amplifier 602, a voltage-controlled oscillator 620, an AND gate 624, and a CLOCK 626. The error amplifier 602 includes any suitable type of comparator, such as a transconductance amplifier or a transconductor. As similarly noted in FIG. 1, illustrative details regarding the contents of the voltage-controlled oscillator 620 are provided below with respect to FIG. 6. As similarly noted in the discussion of FIGS. 1, 3, and 4, an illustrative circuit for providing the CLOCK 626 is provided below with respect to FIG. 6.

Similar to the discussion above with respect to FIG. 1, a reference path 604 is coupled to a non-inverting input of the error amplifier 602. Similar to the discussion above with respect to FIGS. 1 and 3, a feedback path 606 is coupled to an inverting input of the error amplifier 602. The feedback path 606 is also coupled to the node 348 of the load section 340. Similar to the discussion above with respect to FIGS. 1 and 3, a path 608 is coupled to an output of the error amplifier 602 and to a second input (e.g., input F) of the voltage-controlled oscillator 620. The path 608 is also coupled to an inverting input of the comparator 614 through an inverter and a first end of the resistor 616. The second end of the resistor 616 is coupled to a first end of the capacitor 618. The second end of the capacitor 618 is coupled to ground 302. The non-inverting input of the comparator 614 is coupled to the voltage source 612. The voltage source 612 is coupled to the non-inverting input of the comparator 614 and has a current sense coupling (as represented by the hollow circle symbol) to the node 326. The node 326 couples the power converter section 320 and the output filter 330.

A first input (e.g., input V) of the voltage-controlled oscillator 620 is coupled to a clock path 628 (which carries a signal PFM_CLOCK). An output (e.g., output O) of the voltage-controlled oscillator 620 is coupled to a clock path 622 and to a first input of the AND gate 624. A second input of the AND gate 624 is coupled to the clock path 628. An output of the AND gate 624 is coupled to the CLOCK 626. An output of the CLOCK 626 is coupled to the clock path 628. Similar to the discussion above with respect to FIGS. 1 and 3, the clock path 628 is coupled to a set input of the RS flip-flop 630. As discussed above with respect to FIG. 3, a path 632 of the comparator 614 is coupled to a reset input of the RS flip-flop 630. An output of the RS flip-flop 630 is coupled to an input of the power converter 324.

As discussed above with respect to FIG. 3, the node 326 of the power converter 324 is coupled to the first end of the inductor 332. The second end of the inductor 332 is coupled to the first end of the capacitor 334. The second end of the capacitor 334 is coupled to ground 302. The second end of the inductor 332 and the first end of the capacitor 334 are coupled to the first end of the resistor 344. The second end of the resistor 344 is coupled to the node 348 and the first end of the resistor 346. The second end of the resistor 346 is coupled to ground 302.

The pulse generator section 610 includes multiple signals. Similar to the discussion above with respect to FIG. 1, a reference voltage is received on the reference path 604 from an external voltage source and is the non-inverting input of the error amplifier 602. Similar to the discussion above with respect to FIG. 3, a feedback voltage is carried on the feedback path 606 from the node 348 of the load section 340 to the inverting input of the error amplifier 602. Similar to the discussion above with respect to FIG. 1, a signal COMP is carried on the path 608 from an output of the error amplifier 602 to the F input of the voltage-controlled oscillator 620 and the inverting input of the comparator 614. Similar to the discussion above with respect to FIG. 3, an output signal of the comparator 614 is carried on the path 632 to the R input of the RS flip-flop 630. Similar to the discussion above with respect to FIG. 3, the signal PFM_CLOCK is carried on the clock path 628 to the S input of the RS flip-flop 630.

The operation of the pulse-regulated switch-mode power supply circuit 600 as depicted in FIG. 5 is now described. In some examples, similar to the discussion above with respect to FIG. 3, the switching of the power converter section 320 does not stop. Similar to the discussion above with respect to FIGS. 2 and 4, the voltage-controlled oscillator 620 generates an output signal on the clock path 622 based on the comparison of an output of the CLOCK 626 and the signal PFM_COMP. (See discussion below with respect to FIG. 6 for illustrative details regarding the operation of the voltage-controlled oscillator 620.) Similar to the discussion above with respect to FIG. 3, the RC network (e.g., resistor 616, capacitor 618) provides a capacitive bypass to reduce ringing and spiking of the signal COMP. The output signal on the clock path 622 is the first input of the AND gate 624. The second input of the AND gate 624 is the signal PFM_CLOCK on the clock path 628. Because the output of the AND gate 624 goes high when both inputs are high, whichever input of the AND gate 624 remains low for longest governs the signal PFM_CLOCK.

Similar to the discussion above with respect to FIG. 3, the signal PFM_CLOCK is the set input of the RS flip-flop 630, which is configured to prevent multiple pulses during a pulse cycle. Similar to the discussion above with respect to FIG. 3, the reset input goes high when the voltage corresponding to the current from section 320 to section 330 increases above the voltage COMP. In further examples, the pulse-regulated switch-mode power supply circuit 600 is designed to prevent the voltage of the signal COMP from dropping below the voltage supplied by the voltage source 612. (See discussion below with respect to FIG. 7 for an illustrative circuit designed to prevent the voltage of the signal COMP from dropping below the voltage supplied by the voltage source 612.) Similar to the discussion above with respect to FIG. 3, when the signal PFM_CLOCK is high, the output signal Q is high; when the signal PFM_CLOCK is low, the output signal Q is low. When the output signal Q is high, the power converter 324 sets VMOD to equal a voltage of the signal VIN. When the output signal Q is low, the power converter 324 sets VMOD to equal ground 302. In this manner, the power converter 324 delivers the regulated voltage VMOD (e.g., the voltage of the signal VIN as regulated by the signal PFM_CLOCK) to the node 326. The inductor 332 develops a current from the regulated voltage VMOD. The current charges the capacitor 334, which delivers the voltage VOUT.

Assume now that a light load to moderate load is placed on the pulse-regulated switch-mode power supply circuit 600. In this scenario, the comparison between the feedback voltage and the reference voltage results in signal COMP having a low voltage (e.g., 0 V to 0.2 V). As discussed above with respect to FIG. 2, when the voltage of the signal COMP is low, the oscillator 110 produces a low, variable frequency signal PFM_CLOCK equivalent to the signal PFM_COMP. When the signal PFM_CLOCK is high, the output signal Q goes high and the power converter 324 sets VMOD equal to the voltage of the signal VIN. When the signal PFM_CLOCK is low, the output signal Q goes low and the power converter 324 sets VMOD equal to ground 302. In this manner, the power converter 324 delivers the regulated voltage VMOD to the output filter 330, which delivers the voltage VOUT.

Assume now that a heavy load is placed on the pulse-regulated switch-mode power supply circuit 600. In this scenario, the comparison between the feedback voltage and the reference voltage results in the signal COMP carrying a high voltage (e.g., 0.8 V to 1 V). As discussed above with respect to FIG. 2, when the voltage of the signal COMP is high, the oscillator 110 produces a fixed frequency signal PFM_CLOCK equivalent to the signal CLOCK. When the signal PFM_CLOCK is high, the output signal Q goes high and the power converter 324 sets VMOD equal to the voltage of the signal VIN. When the signal PFM_CLOCK is low, the output signal Q goes low and the power converter 324 sets VMOD equal to ground 302. In this manner, the power converter 324 delivers the regulated voltage VMOD to the output filter 330, which delivers the voltage VOUT. As demonstrated, under all load conditions, the switching of the power converter section 320 does not stop. As a result, the advantages of an average output voltage that is steady and independent of load are realized.

Figure 6:
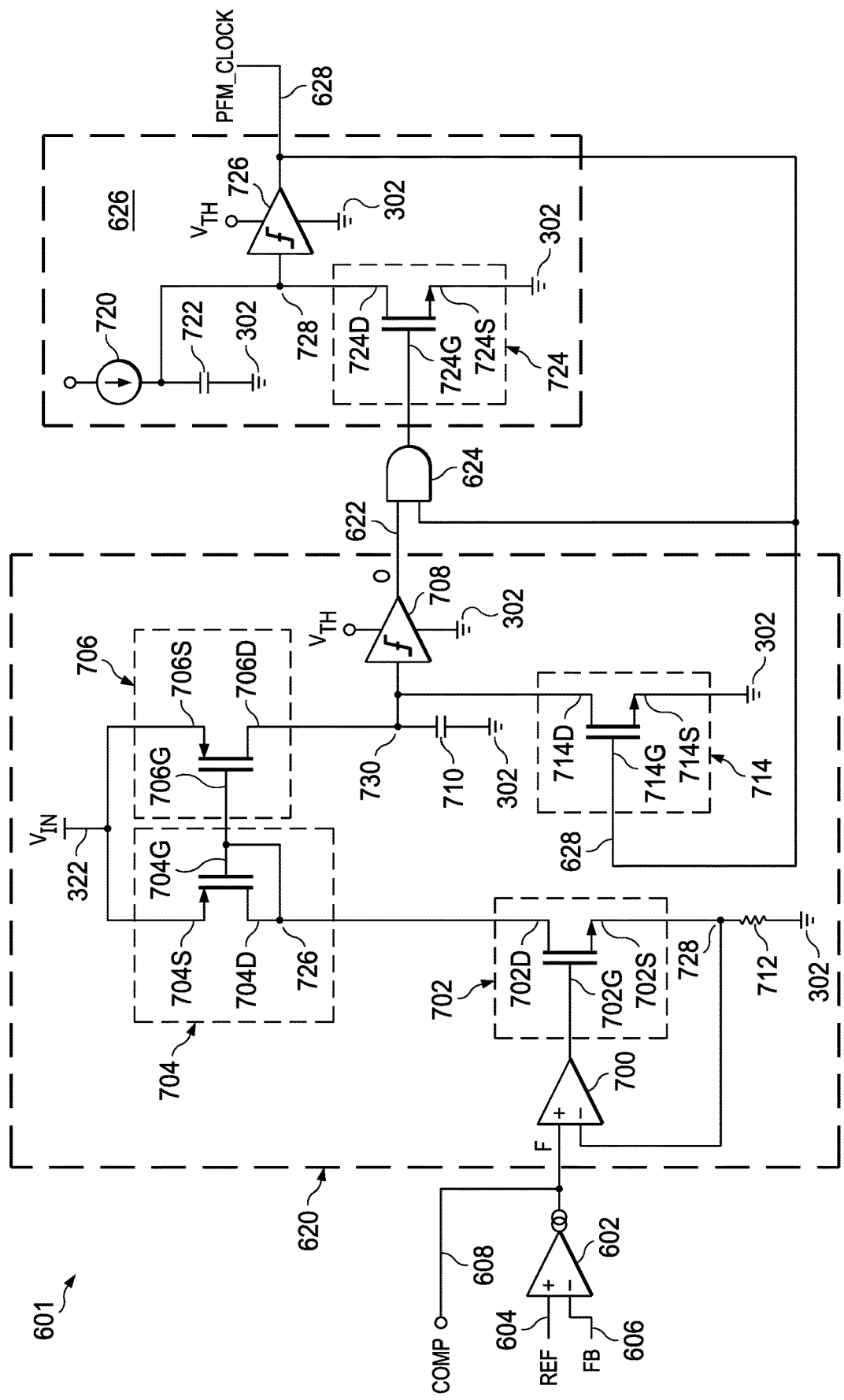
FIG. 6 depicts a schematic diagram of an automatic frequency oscillator circuit in accordance with various examples.

FIG. 6 is a schematic diagram containing the automatic frequency oscillator 601 of the pulse-regulated switch-mode power supply circuit 600, in accordance with various examples. The automatic frequency oscillator 601 couples to the feedback path 606, the path 608, and the clock path 628 of FIG. 5. In some examples, the automatic frequency oscillator 601 includes a voltage-controlled oscillator 620. In further examples, the voltage-controlled oscillator 620 includes a comparator 700, a transistor 702, a transistor 704, a transistor 706, a transistor 714, a resistor 712, a capacitor 710, and a buffer 708. In some examples, the CLOCK 626 includes a current source 720, a capacitor 722, a transistor 724, and a buffer 726. In some examples, the transistors 702, 704, 706, 714, 724 are field-effect transistors (FETs). In further examples, the transistors 702, 714, 724 are n-channel MOSFETs (e.g., nMOSFETs, NMOS) and the transistors 704, 706 are p-channel MOSFETs (e.g., pMOSFETs, PMOS). In some examples, the buffers 708, 726 are digital buffers having a fixed threshold VTH. In other examples, the buffers 708, 726 are comparators, each having a fixed threshold VTH as an input. In some examples, the transistors 714, 724 are replaced by another type of switch, such as a diode.

As discussed above with respect to FIG. 5, the voltage-controlled oscillator 620 includes multiple input paths. The clock path 628 carries the signal PFM_CLOCK (FIG. 5). The path 608 carries the signal COMP (FIG. 5). The input path 322 carries the signal VIN (FIG. 5). The voltage-controlled oscillator 620 also includes an output path. The output path is the clock path 622 carrying a signal based on the comparison of the signal PFM_COMP and the signal PFM_CLOCK (FIG. 5).

The transistor 702 comprises a drain terminal 702D, a gate terminal 702G, and a source terminal 702S. The gate terminal 702G is coupled to an output of the comparator 700. A non-inverting input of the comparator 700 (e.g., input F of the voltage-controlled oscillator 620) is coupled to the path 608 carrying the signal COMP. An inverting input of the comparator 700 is coupled to the source terminal 702S and a first end of the resistor 712. A second end of the resistor 712 is coupled to ground 302.

The transistor 704 comprises a drain terminal 704D, a gate terminal 704G, and a source terminal 704S. The drain terminal 704D is coupled to an input node 728 the drain terminal 702D, and the gate terminal 704G. The source terminal 704S is coupled to the input path 322 carrying the signal VIN.

The transistor 706 comprises a drain terminal 706D, a gate terminal 706G, and a source terminal 706S. The source terminal 706S is coupled to the input path 322 carrying the signal VIN and the source terminal 704S. The drain terminal 704D is coupled to an output node 730, a first end of the capacitor 710, and an input of the buffer 708. A second end of the capacitor 710 is coupled to ground 302.

The transistor 714 comprises a drain terminal 714D, a gate terminal 714G, and a source terminal 714S. The source terminal 714S is coupled to ground 302. The gate terminal 714G is coupled to the clock path 628 carrying the signal PFM_CLOCK. The drain terminal 714D is coupled to the output node 730, the first end of the capacitor 710, the drain terminal 706D, and the input of the buffer 708. An output of the buffer 708 is coupled to the clock path 622. The clock path 622 is coupled to the first input of the AND gate 624. The clock path 628 is coupled to the second input of the AND gate 624.

The transistor 724 comprises a drain terminal 724D, a gate terminal 724G, and a source terminal 724S. The output of the AND gate 624 is coupled to the gate terminal 724G. The source terminal 724S is coupled to ground 302. The drain terminal 724D is coupled to an input of the buffer 726, a first end of the capacitor 722, and the current source 720. A second end of the capacitor 722 is coupled to ground 302. An output of the buffer 726 is coupled to the clock path 628 carrying the signal PFM_CLOCK, the second input of the AND gate 624, and the gate terminal 716G.

The operation of the voltage-controlled oscillator 620 as depicted in FIG. 6 is now described. In some examples, the comparator 700, the transistor 702, and the resistor 712 are to amplify a current of the signal COMP. The current through the output node 730 equals the voltage at the non-inverting input F (e.g., voltage of the signal COMP) divided by the resistance of the resistor 712 and multiplied by the current mirror ratio of the transistors 704, 706. In this manner, the current through the output node 730 is proportional to the voltage of the signal COMP. Similar to the discussion above with respect to FIG. 4, the current through the output node 730 controls a charging rate of the capacitor 710. The charging rate of the capacitor 710 is equal to the current through the output node 730 divided by a capacitance of the capacitor 710. The charging rate of the capacitor 710 determines the frequency of the signal PFM_COMP. In this manner, the signal PFM_COMP is based on the voltage of the signal COMP. When a voltage across the capacitor 710 reaches the threshold of the buffer 708 and the signal PFM_CLOCK on the clock path 628 goes high to drive the transistor 714 closed, the output of the buffer 708 goes high.

The operation of the CLOCK 626 as depicted in FIG. 6 is now described. In some examples, the current source 720, a capacitance (C) of the capacitor 722, and a threshold voltage VTH of the buffer 726 determines the period of the signal PFM_CLOCK signal. For example, if a current of the current source 720 is 1, then the period of the signal PFM_CLOCK would be (C-Vth)/1. However, the pulsing of the signal PFM_CLOCK depends on both the output of the AND gate 624 as well as the charging rate of the capacitor 722. For the buffer 726 to go high, enabling the signal PFM_CLOCK, the transistor 724 should close. The transistor 724 closes when both the output of the buffer 708 of the voltage-controlled oscillator 620 goes high and a signal PFM_CLOCK on the clock path 628 is high. In this manner, the timing of the signal PFM_CLOCK is said to be regulated by the voltage of the signal COMP.

Assume now that a light load to moderate load is placed on the pulse-regulated switch-mode power supply circuit 600. As discussed above with respect to FIG. 5, under light load to moderate load conditions, the comparison between the feedback voltage and the reference voltage results in the signal COMP carrying a low voltage (e.g., 0 V to 0.1 V). When the voltage of the signal COMP is low, the current mirror of the voltage-controlled oscillator 620 generates low current (e.g., 50 nano-amps or less), so the capacitor 710 is charged slowly, and the frequency of the signal PFM_COMP is low. The signal PFM_CLOCK will not go high until the voltage of the capacitor 710 at the output node 730 exceeds the fixed threshold VTH of the buffer 708. The low voltage (e.g., 0 V to 0.1 V) across the capacitor 710 prevents the next pulse of the signal PFM_CLOCK. Therefore, the frequency of the signal PFM_COMP is governing the system switching frequency. In this manner, when the voltage of the signal COMP is low, the signal PFM_CLOCK is a variable-frequency regulated clock, where the variable frequency is determined by the frequency of the signal PFM_COMP as determined by the charging rate of the capacitor 710. As illustrated by the low current of the current mirror, the voltage-controlled oscillator 620 results in a low quiescent current (e.g., 10 nano-amps to 1 micro-amp) under light to moderate load conditions.

Assume now that a heavy load is placed on the pulse-regulated switch-mode power supply circuit 600. As discussed above with respect to FIG. 5, under heavy load conditions, the comparison between the feedback voltage and the reference voltage results in the signal COMP having a high voltage (e.g., 0.8 V to 1 V). When the voltage of the signal COMP is high, the capacitor 710 is charged more rapidly, and the frequency of the signal PFM_COMP is high.

However, the signal PFM_CLOCK cannot go high when the voltage of the capacitor 710 at the output node 730 exceeds the fixed threshold VTH of the buffer until the CLOCK 626 generates a pulse. Hence the frequency of the signal CLOCK controls the signal PFM_CLOCK. In this manner, when the voltage of the signal COMP is high, the signal PFM_CLOCK is a fixed-frequency regulated clock, where the fixed frequency is determined by the frequency of the signal CLOCK. As illustrated by the examples, the switching of PFM_CLOCK does not stop, so the advantages of an average output voltage that is steady and independent of load are realized.

Figure 7:
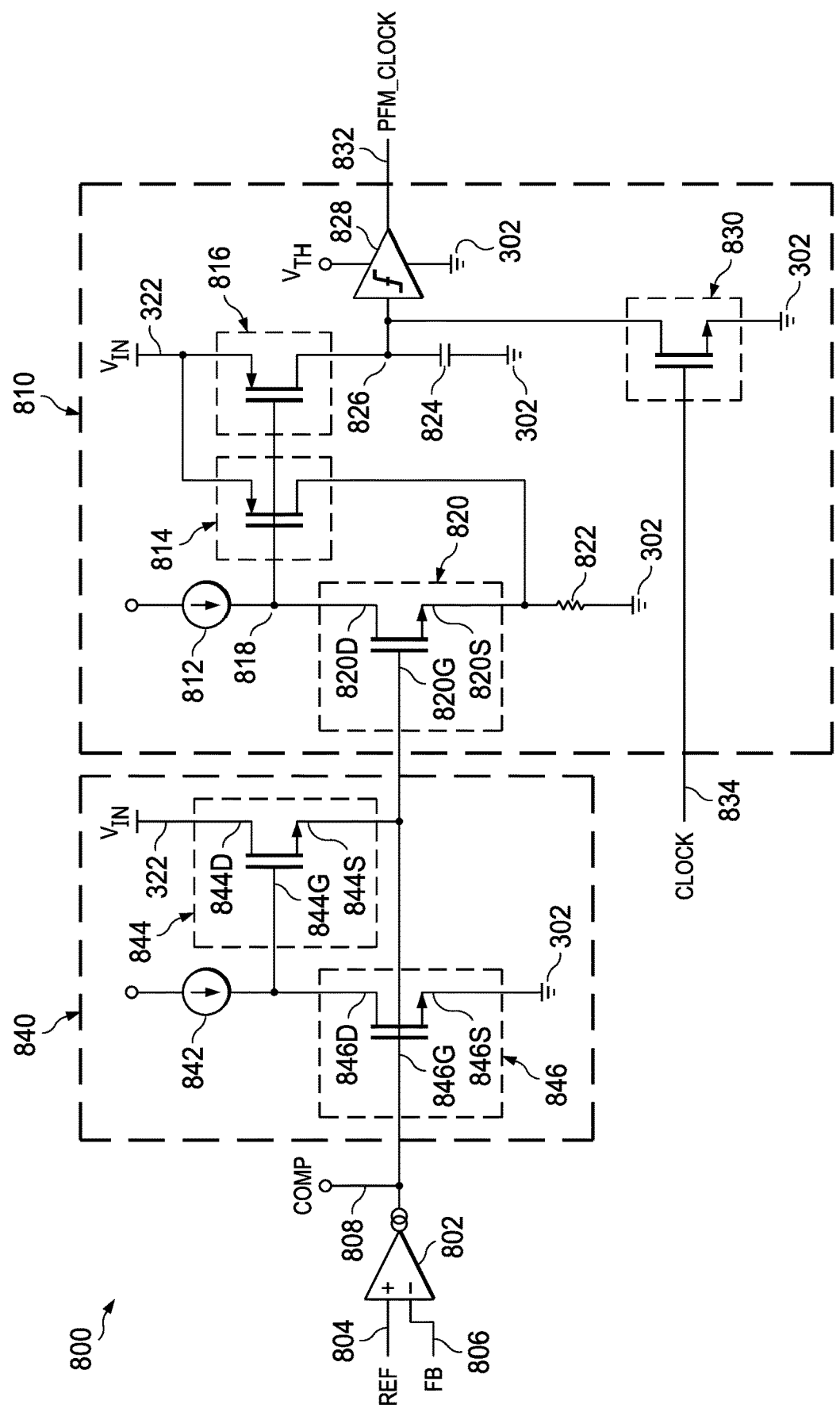
FIG. 7 depicts a schematic diagram of a clamping circuit of a pulse-regulated switch-mode power supply circuit in accordance with various examples.

FIG. 7 is a schematic diagram of a clamping circuit 840 of a pulse-regulated switch-mode power supply circuit 800, in accordance with various examples. The clamping circuit 840 couples to a path carrying a signal COMP of a pulse-regulated switch-mode power supply circuit. In some examples, the clamping circuit 840 couples to the path 108 of the pulse-regulated switch-mode power supply circuit 300 (FIG. 3). In other examples, the clamping circuit 840 couples to the path 608 of the pulse-regulated switch-mode power supply circuit 600 (FIG. 5). The comparator 802 is included for illustrative purposes and is similar to the comparator 102 (FIG. 1) and the error amplifier 602 (FIG. 5). A non-inverting input of the comparator 802 is coupled to a reference path 804 and an inverting input of comparator is coupled to a feedback path 806. For illustrative purposes, an oscillator 810 is included to demonstrate the coupling of the clamping circuit 840. Similar to the oscillator 110 of FIG. 4, the oscillator 810 comprises a variable one-shot circuit and includes a current source 812, a transistor 820, a transistor 814, a transistor 816, a transistor 830, a resistor 822, a capacitor 824, and a buffer 828. In some examples, the clamping circuit 840 includes a current source 842, a transistor 846, and a transistor 844. In some examples, the transistors 814, 816, 820, 830, 844, 846 are field-effect transistors (FETs). In further examples, the transistors 820, 830, 844, 846 are n-channel MOSFETs (e.g., nMOSFETs, NMOS) and the transistors 814, 816 are p-channel MOSFETs (e.g., pMOSFETs, PMOS). In some examples, the buffer 828 is a digital buffer having a fixed threshold VTH. In other examples, the buffer 828 is a comparator having a fixed threshold VTH as an input. In some examples, the transistor 830 is replaced by another type of switch, such as a diode.

In some examples, the transistor 846 comprises a drain terminal 846D, a gate terminal 846G, and a source terminal 846S. The gate terminal 846G is coupled to a path 808 carrying the signal COMP. The source terminal 846S is coupled to ground 302. The drain terminal 846D is coupled to the current source 842. The transistor 844 comprises a drain terminal 844D, a gate terminal 844G, and a source terminal 844S. The drain terminal 844D is the input path 322 carrying the signal VIN. The gate terminal 844G is coupled to the current source 842 and the drain terminal 846D. The source terminal is coupled to the path 808 carrying the signal COMP.

In some examples, the oscillator 810 is configured similarly to the oscillator 110 in that the current source 812, the transistors 814, 816, 820, 830, the resistor 822, the capacitor 824, the buffer 828, an input node 818, an output node 826, a clock path 832, and a clock path 834 are coupled to each other in the same manner as the current source 402, the transistors 404, 410, 412, 418, the resistor 406, the capacitor 414, the buffer 416, the input node 408, the output node 420, the clock path 112, and the clock path 114 are coupled to each other (FIG. 4). The oscillator 810 is configured to accept a signal CLOCK on a clock path 834 and generate a signal PFM_CLOCK on the clock path 832. However, because the clamping circuit 840 is configured to prevent the signal COMP on the path 808 from dropping below a threshold voltage, a gate terminal 820G of the transistor 820 is coupled to the path 808 as well as the source terminal 844S.

The operation of the clamping circuit 840 as depicted in FIG. 7 is now described. In some examples, the transistors 844, 846 clamp the signal COMP. When the transistor 846 switches off, the current source 842 switches on the transistor 844. In this way, the voltage of the signal COMP goes no lower than a threshold voltage (VTH) of the transistor 846.

Figure 8:
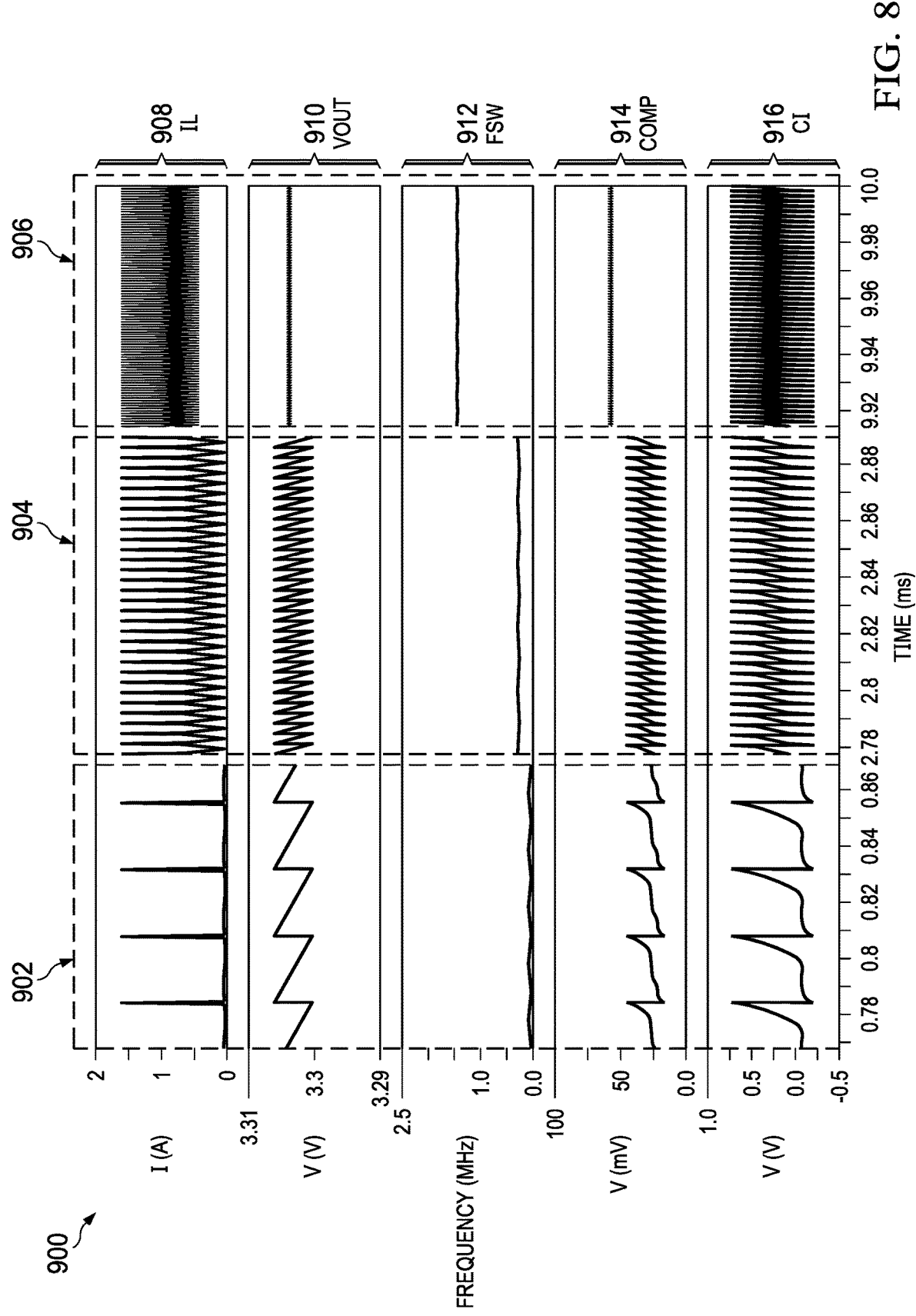
FIG. 8 depicts a timing diagram of a pulse-regulated switch-mode power supply in accordance with various examples.

FIG. 8 is a timing diagram 900 of the operation of the pulse-regulated switch-mode power supply circuit 300, 600 as described herein, in accordance with various examples. An IL waveform 908 corresponds to the inductor current. A y-axis of the IL waveform 908 timing diagram indicates a current measurement in amperes (A). An x-axis of the IL waveform 908 timing diagram indicates a time measurement in milliseconds (ms). A VOUT waveform 910 corresponds to an output voltage generated by the output filter 330. A y-axis of the VOUT waveform 910 timing diagram indicates a voltage measurement in volts (V). An x-axis of the VOUT waveform 910 timing diagram indicates a time measurement in milliseconds (ms). A FSW waveform 912 corresponds to a frequency of the signal PFM_CLOCK generated by the automatic frequency oscillator 100, 601. A y-axis of the FSW waveform 912 timing diagram indicates a frequency measurement in megahertz (MHz). An x-axis of the FSW waveform 912 timing diagram indicates a time measurement in milliseconds (ms). A COMP waveform 914 corresponds the voltage of the signal COMP generated by the comparator 102, 602. A y-axis of the COMP waveform 914 timing diagram indicates a voltage measurement in millivolts (mV). An x-axis of the COMP waveform 914 timing diagram indicates a time measurement in milliseconds (ms). A C1 waveform 916 corresponds to the charging of the capacitor 414, 710. A y-axis of the C1 waveform 916 timing diagram indicates a voltage measurement in volts (V). An x-axis of the C1 waveform 916 timing diagram indicates a time measurement in milliseconds (ms).

Referring to the waveforms of FIG. 8 along with FIGS. 3, 4, 5, and 6, initially, the pulse-regulated switch-mode power supply circuit 300, 600 operates under a light load condition, as indicated by load condition 902. Under light load conditions, the comparison between the feedback voltage and the reference voltage results in the signal COMP carrying a low voltage, as indicated by the average voltage of 25 mV of the COMP waveform 914. When the voltage of the signal COMP is low, the current mirror of the automatic frequency oscillator 100, 601 generates a low current (e.g., 0 microamps to 1 micro-amp), so the capacitor 414, 710 is charged slowly. As indicated by the C1 waveform 916, the capacitor 414, 710 takes approximately 0.02 ms to be charged. The charging rate of the capacitor 414, 710 controls the frequency of the signal PFM_CLOCK as indicated by the FSW waveform 912. After the capacitor 414, 710 exceeds the fixed threshold VTH of the buffer 416, 708, the signal PFM_CLOCK pulses and the inductor 332 builds a current, as indicated by the spikes of the IL waveform 908 corresponding to the spikes of the C1 waveform 916. The spikes of the VOUT waveform 910 correspond to the peak current of the IL waveform 908 and decreases as the charge across the capacitor 334 dissipates.

Still referring to the waveforms of FIG. 8 along with FIGS. 3, 4, 5, and 6, assume now that the pulse-regulated switch-mode power supply circuit 300, 600 operates under a moderate load condition, as indicated by load condition 904. Under moderate load conditions, the comparison between the feedback voltage and the reference voltage also results in the signal COMP carrying a low voltage (e.g., 0 V to 0.1 V), as indicated by the average voltage of 30 mV of the COMP waveform 914. When the voltage of the signal COMP is low, the capacitor 414, 710 is charged slowly, though not as slowly as under light load conditions. As indicated by the C1 waveform 916, the capacitor 414, 710 takes approximately 0.002 ms to be charged. The charging rate of the capacitor 414, 710 controls the frequency of the signal PFM_CLOCK as indicated by the FSW waveform 912. Because the charging rate under moderate loads is faster, the frequency of the FSW waveform 912 is higher than the under light load conditions. After the capacitor 414, 710 exceeds the fixed threshold VTH of the buffer 416, 708, the signal PFM_CLOCK pulses and the inductor 332 builds a current, as indicated by the spikes of the IL waveform 908 corresponding to the spikes of the C1 waveform 916. The spikes of the VOUT waveform 910 correspond to the peak current of the IL waveform 908 and decreases as the charge across the capacitor 334 dissipates.

Still referring to the waveforms of FIG. 8 along with FIGS. 3, 4, 5, and 6, assume now that the pulse-regulated switch-mode power supply circuit 300, 600 operates under a heavy load condition, as indicated by load condition 906. Under heavy load conditions, the comparison between the feedback voltage and the reference voltage results in the signal COMP carrying a high voltage (e.g., 0.8 V to 1 V), as indicated by the average voltage of 50 mV of the COMP waveform 914. When the voltage of the signal COMP is high, the capacitor 414, 710 is charged quickly, as indicated by the C1 waveform 916. The frequency of the signal PFM_CLOCK will be dictated by the fixed-frequency clock of the pulse-regulated switch-mode power supply circuit 300, 600. The FSW waveform 912 indicates the clock has a frequency of 1.5 MHz. As illustrated by the load conditions 902, 904, 906, the switching of PFM_CLOCK does not stop. Additionally a comparison of the VOUT waveform 910 demonstrates that, independent of the load, an average output voltage is steady.

Figure 9:
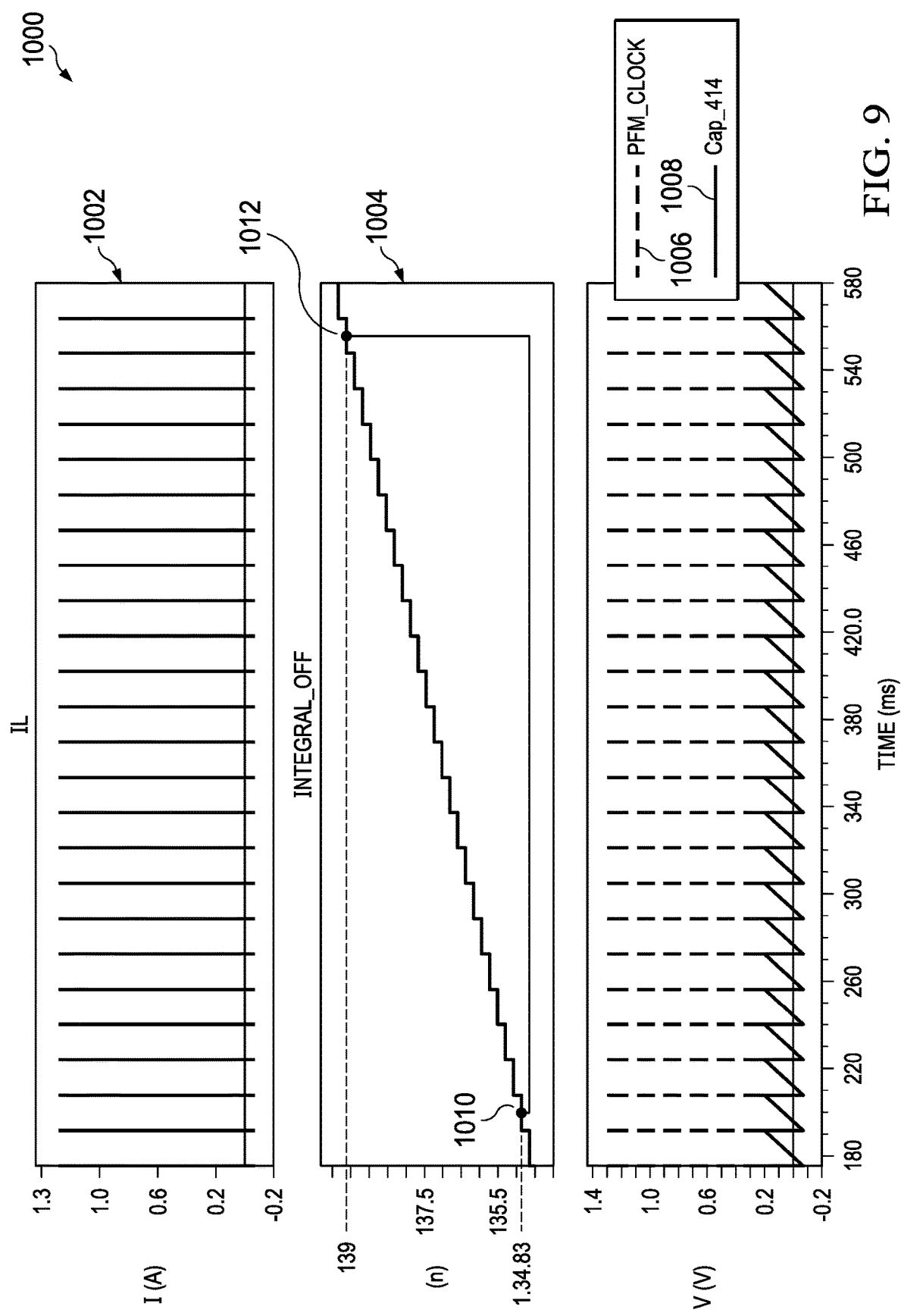
FIG. 9 depicts a timing diagram of the operation of an automatic frequency oscillator of a pulse-regulated switch-mode power supply in accordance with various examples.

FIG. 9 is a timing diagram 1000 of the automatic frequency oscillator 100 of the pulse-regulated switch-mode power supply circuit 300, in accordance with various examples. An IL waveform 1002 corresponds to the inductor current. A y-axis of the IL waveform 1002 timing diagram indicates a current measurement in amperes (A). An x-axis of the IL waveform 1002 timing diagram indicates a time measurement in milliseconds (ms). An integral_off waveform 1004 corresponds to an integral of the current into the automatic frequency oscillator 100. A y-axis of the integral_off waveform 1004 timing diagram indicates a current measurement in nano-amperes (n). An x-axis of the integral_off waveform 1004 timing diagram indicates a time measurement in milliseconds (ms). A PFM_CLOCK waveform 1006 corresponds to the signal PFM_CLOCK. A Cap_414 waveform 1008 corresponds to the charging rate of the capacitor 414. Because the PFM_CLOCK waveform 1006 is based on a comparison with the charging rate of the capacitor 414, as represented by the Cap_414 waveform 1008, the two waveforms are presented on the same timing diagram. A y-axis of the PFM_CLOCK waveform 1006, Cap_414 waveform 1008 timing diagram indicates a voltage measurement in volts (V). An x-axis of the PFM_CLOCK waveform 1006, Cap_414 waveform 1008 timing diagram indicates a time measurement in milliseconds (ms).

Referring to the waveforms of FIG. 9 along with FIGS. 3 and 4, the pulse-regulated switch-mode power supply circuit 300 operates in a light load condition. Assume the voltage of the capacitor 414 has been dissipated. The feedback voltage indicates a light load at the node 348. The comparison between the feedback voltage and the reference voltage results in signal COMP carrying a low voltage (e.g., 0 V to 0.1 V). When the voltage of the signal COMP is low, the current mirror of the oscillator 110 generates low current (e.g., 0.1 micro-amps to 1 micro-amp), so the capacitor 414 is charged slowly, and the frequency of the signal PFM_COMP follows, as indicated by the overlapping waveforms 1006, 1008. After the voltage of the capacitor 414 at the output node 420 exceeds the fixed threshold of the buffer 416, as indicated by a spike in the waveforms 1006, 1008, the next pulse of the signal PFM_CLOCK is triggered and the charging cycle begins again. The pulse of the signal PFM_CLOCK allows current to build in the inductor 332, as indicated by the corresponding spikes of the PFM_CLOCK waveform 1006 and the IL waveform 1002. The integral_off waveform 1004 demonstrates the low quiescent current under light load conditions. By calculating the slope of the integral_off waveform 1004 between a point 1010 and a point 1012, a quiescent current of approximately 13 nA is shown.

Figure 10:
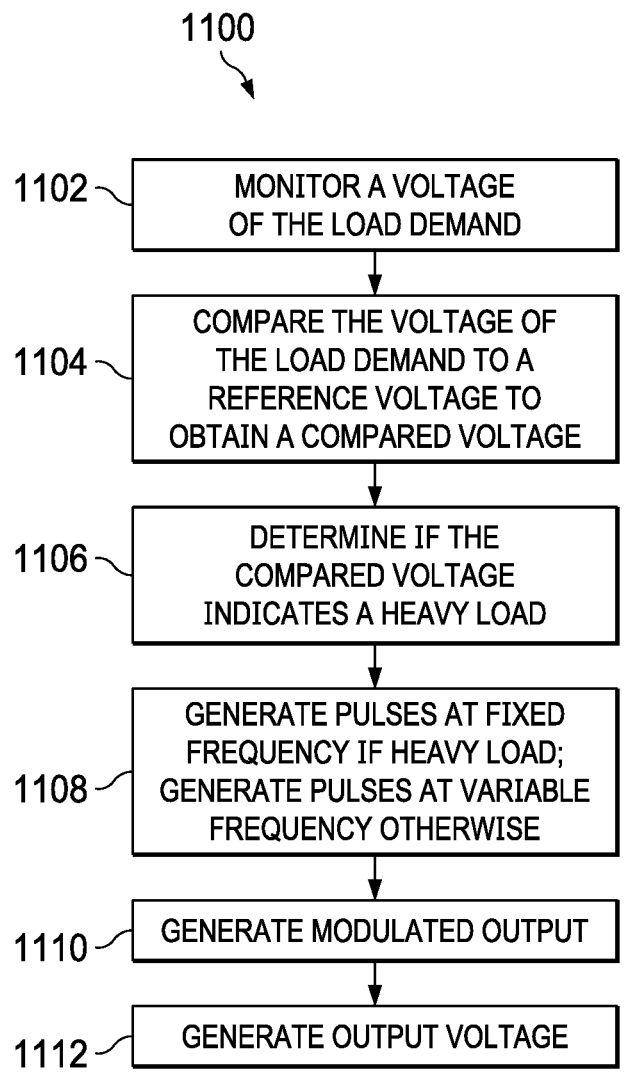
FIG. 10 depicts a flowchart of the operation of an automatic frequency oscillator of a pulse-regulated switch-mode power supply in accordance with various examples.

FIG. 10 is a flowchart 1100 of the operation of the pulse-regulated switch-mode power supply circuit 300, 600, in accordance with various examples. The pulse-regulated switch-mode power supply circuit 300, 600 monitors a voltage of the load demand (e.g., feedback voltage) (1102). The comparator 102, 602 compares the voltage of the load demand to a reference voltage to obtain a compared voltage (e.g., voltage of the signal COMP) (1104). The automatic frequency oscillator circuit 100, 601 determines if the compared voltage indicates a heavy load (1106). The automatic frequency oscillator circuit 110, 601 generates pulses at fixed frequency if a heavy load and generates pulses at variable frequency otherwise (1108). The power converter section 320 generates a regulated output (1110). The output filter 330 generates an output voltage (1112).

In the foregoing discussion, the terms "including" and "comprising" are used in an open-ended fashion, and thus should be interpreted to mean "including, but not limited to . . . ." The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A. A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device that is said to include certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be configured to couple to at least some of the passive elements and/or the sources to form the described structure either at a time of manufacture or after a time of manufacture, for example, by an end-user and/or a third-party.

While certain components are described herein as being of a particular process technology (e.g., FET, metal oxide semiconductor FET (MOSFET), n-type, p-type, etc.), these components may be exchanged for components of other process technologies (e.g., replace FET and/or MOSFET with BJT, replace n-type with p-type or vice versa, etc.) and reconfiguring circuits including the replaced components to provide desired functionality at least partially similar to functionality available prior to the component replacement. Components illustrated as resistors, unless otherwise stated, are generally representative of any one or more elements coupled in series and/or parallel to provide an amount of impedance represented by the illustrated resistor. Unless otherwise stated, "about", "approximately", or "substantially" preceding a value means+/−10 percent of the stated value.

The above discussion is meant to be illustrative of the principles and various examples of the present disclosure. Numerous variations and modifications will become apparent to those skilled in the art once the above disclosure is fully appreciated. It is intended that the present disclosure be interpreted to embrace all such variations and modifications.

What is claimed is:

1. A switch-mode power supply circuit, comprising:
an output filter configured to provide an output voltage;
a pulse generation circuit comprising:
    a comparator having a comparator output, wherein the comparator is configured to provide a signal at the comparator output proportional to a difference between the output voltage and a reference voltage; and
    an oscillator configured to provide, responsive to the signal at the comparator output, an output clock signal having either a fixed frequency based on an input clock signal or a variable frequency, wherein the oscillator includes:
        a transistor having first and second current terminals and a control terminal, wherein the first current terminal is coupled to a current source, and the control terminal is coupled to the comparator output; and
        a current mirror coupled between an input voltage terminal and the second current terminal, and having a current mirror control terminal coupled to the first current terminal, wherein the current mirror is configured to provide a mirrored current proportional to a current through the transistor; and
a power converter configured to be operated using the output clock signal.

2. The switch-mode power supply circuit of claim 1, the oscillator further comprising a capacitor coupled between the current mirror and a ground terminal, wherein a capacitor voltage across the capacitor is determined by a charging rate that is proportional to the mirrored current.

3. The switch-mode power supply circuit of claim 2, wherein the transistor is a first transistor, the control terminal is a first control terminal, and the oscillator further comprising a second transistor having third and fourth current terminals and a second control terminal, in which the third current terminal is coupled to the current mirror and the capacitor, the fourth current terminal is coupled to the ground terminal, and the second control terminal is configured to receive the input clock signal.

4. The switch-mode power supply circuit of claim 3, the oscillator further comprising a buffer having a fixed threshold voltage, wherein the capacitor voltage and the input clock signal operate the buffer to provide the output clock signal to drive the power converter.

* * * * *